(No Model.)  2 Sheets—Sheet 1.
T. SUTTON.
SHAFTING AND BEARINGS.
No. 299,940. Patented June 3, 1884.
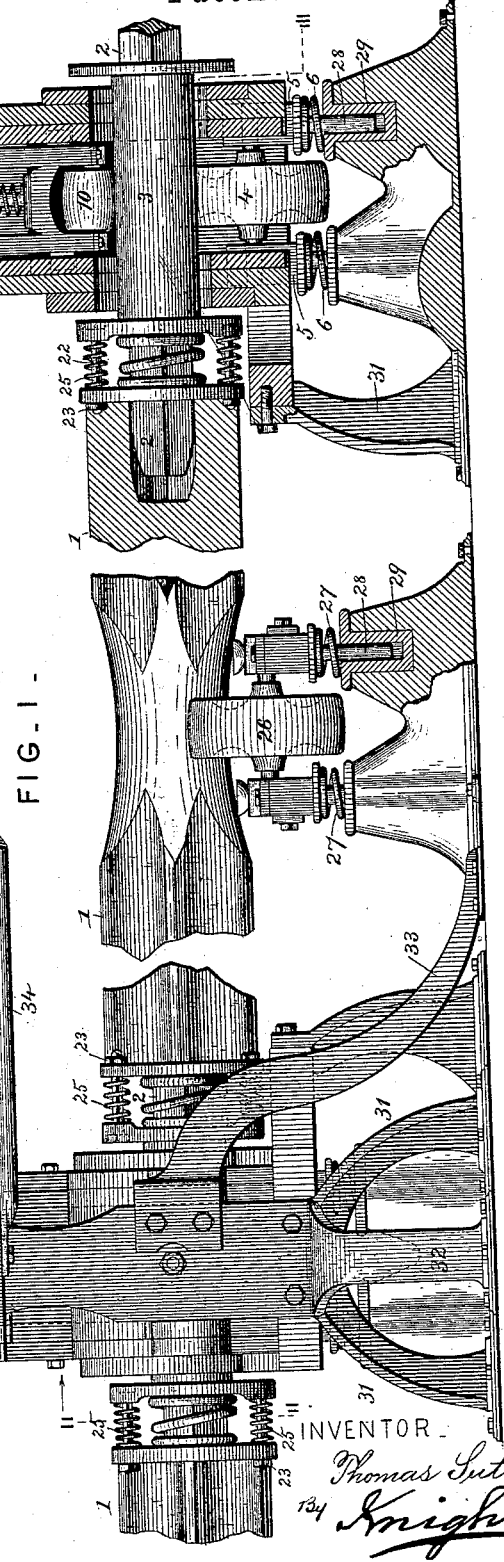
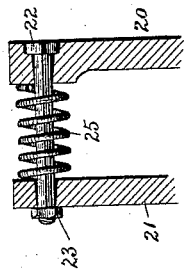
FIG. IV.
FIG. I.
ATTEST-
Geo. T. Smallwood,
J. Henry Kaiser.
INVENTOR-
Thomas Sutton
by Knight Bros.
attys.

(No Model.) 2 Sheets—Sheet 2.
T. SUTTON.
SHAFTING AND BEARINGS.
No. 299,940. Patented June 3, 1884.
FIG. II.
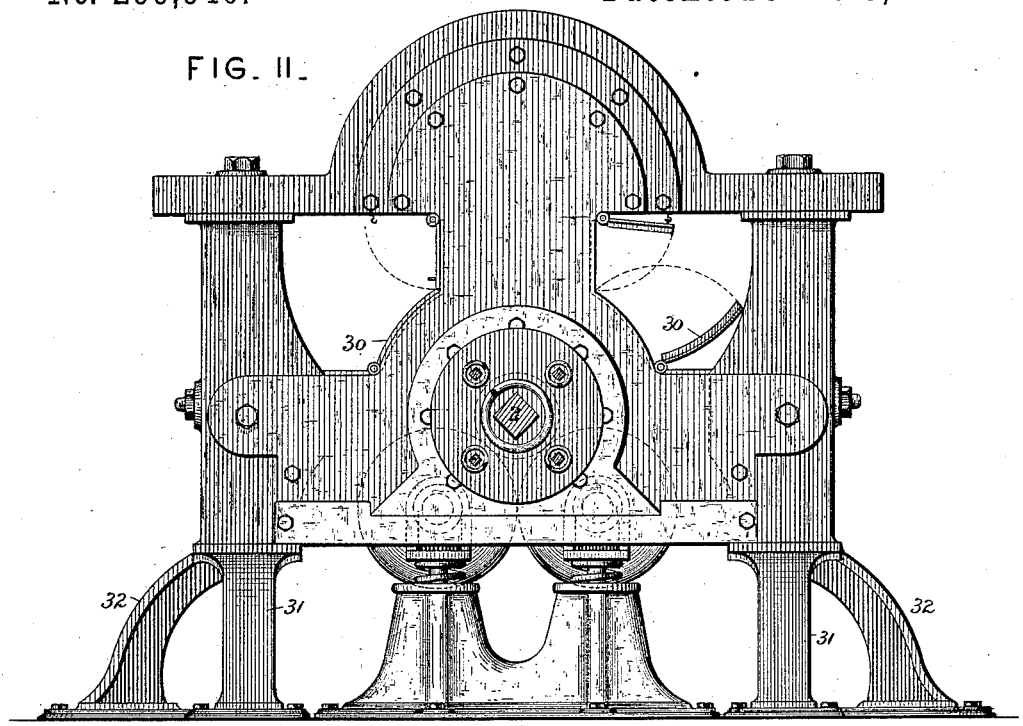
FIG. III.
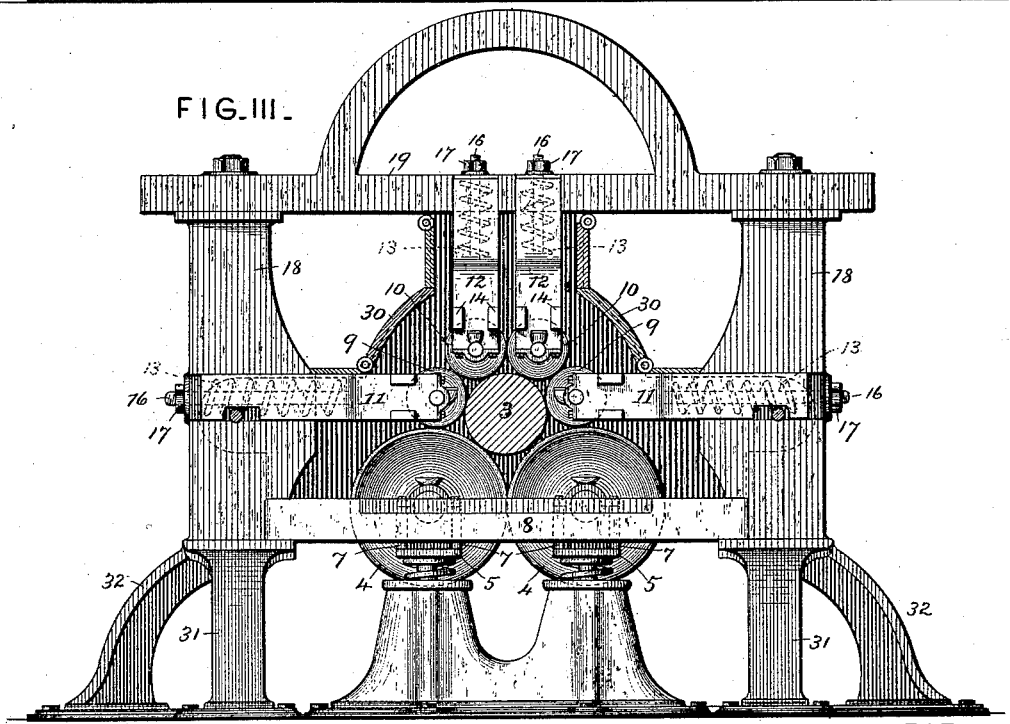
ATTEST: Geo. P. Smallwood, J. Henry Kaiser.
INVENTOR: Thomas Sutton.
By Knight Bros., attys.

UNITED STATES PATENT OFFICE.

THOMAS SUTTON, OF CHEBOYGAN, MICHIGAN, ASSIGNOR OF ONE-HALF TO GEORGE F. RAYNOLDS, GEORGE E. FROST, AND WILLIAM McARDLE, ALL OF SAME PLACE.

SHAFTING AND BEARING.

SPECIFICATION forming part of Letters Patent No. 299,940, dated June 3, 1884.

Application filed April 17, 1884. (No model.)

*To all whom it may concern:*

Be it known that I, THOMAS SUTTON, residing at Cheboygan, in the county of Cheboygan and State of Michigan, have invented a new and useful Improvement in Shafting and Bearings therefor, of which the following is a specification.

My invention is applicable to line-shafting, and possesses especial value in its application to marine shafting for screw-propellers.

It relates, essentially, to a new and improved mode of mounting and coupling the shafting, so as to relieve it from a large part of the friction and severe transverse strains to which marine propeller-shafts are subjected by the straining of the vessel and the resistance of the water under the motion of the ship. To these ends I construct my shaft in sections coupled together by joints permitting the relative deflection of the shaft-sections within any necessary limits, while effectively transmitting the required rotary movement from one to the other, and I support the journals on bearing-rollers mounted in housings sustained by springs, which are adapted to yield in any direction, so as to relieve the shaft and bearings from the effect of sudden shocks and strains.

The invention further relates to details in carrying my invention into effect, which will be hereinafter fully described.

In the accompanying drawings, Figure I is a side elevation, partly in section, of a portion of a shaft and bearings and their accessories, illustrating my invention. Fig. II is a transverse section of the same on the line II II, Fig. I. Fig. III is a transverse section of the same on the line III III, Fig. I. Fig. IV is a detail longitudinal section on a larger scale.

The main shaft-sections 1 are fluted, as shown in Fig. I, and are made hollow at their extremities, to receive the ends 2 of the intermediate shafts, 3, which form the journals, resting upon bearing-rolls 4, the boxes or housings 5 of which are supported by springs 6, and are guided by tongues 7, projecting from the said housings 5 into grooves prepared therefor in the inclosing frame 8. The rolls 4 and their housings 5 and supporting-springs 6 are made quite massive and strong, so as to sustain the weight of the shaft and hold it up to its proper normal position. The said journals are held normally in central position by rollers 9 and 10, which are respectively mounted in housings 11 and 12, the former having a horizontal movement radial to the journals to take up the horizontal play of the journal under sudden strains in this direction and restore it to its normal position, while the housings 12 of the upper rolls have a vertical play to yield to upward strains. These housings 11 and 12 are supported by springs 13, which yield to sudden strains and restore the journals to their normal position, said housings being guided by tongues 14 and by arms 15, working in suitable grooves in the stationary frame, so as to guide the housings of the rollers in their radial movement and secure them against displacement. Guiding bolts or stems 16 from the housings 11 and 12 extend completely through the standards 18 and cap-beams 19 of the frame, and are furnished with nuts 17, by means of which the rollers 9 and 10 are drawn and held apart in opposition to the pressure of the springs 13 when the shaft is to be introduced or removed. The ends 2 of the short journal-shaft 3, which project and engage within the end cavities of the main shaft-sections 1, are made of square or other non-circular shape in transverse section, and engage in sockets of corresponding shape in the shaft-sections 1, so as to transmit the rotary movement; but the parts do not fit in such a manner as to interfere with the relative deflection of the shaft-sections. The journal-shafts 3 and main shaft-sections 1 are furthermore connected by collars 20 21, bolted to these respective parts and connected together by square countersunk bolts 22 and nuts 23, said bolts fitting corresponding holes in the collars 20 21, so as to assist and strengthen the torsional connections between the shaft-sections for communicating rotation, while permitting the collars to approach and recede to and from each other under the relative endwise movement of the shaft-sections 1 and journal-shafts 3. The collars 20 21 are pressed apart by springs 24, surrounding the journal-shafts, and secondary spiral springs 25, surrounding the bolts 22, in order to hold the parts in their relative position endwise. If preferred, single springs encircling all the bolts 22 may be substituted for the individual springs 25. Flat metal springs or gum springs may, if preferred, be substituted for any or all of the springs 6, 13, 24, and 25. The central portion of the sectional shafts 1 is rounded or provided with a circular bearing-flange, and is supported by paired anti-friction rolls 26, supported by springs 27, to sustain or partly sustain the weight of the shaft-sections 1.

The stems 28 of the various bearing-rolls 4 and 26 work in steel bushings 29, which may be readily and inexpensively renewed and afford facility for lubrication.

The journals 3 and their supporting-rolls 4, 9, and 10, and the housings and supporting-springs thereof are completely inclosed by hinged covers and shouldered plates, so constructed and arranged as to thoroughly protect the parts from dust and grit, while permitting sufficient freedom of movement to the rollers. The hinged covers 30 give access to the parts for lubrication.

The entire structure is firmly and securely braced longitudinally and laterally by stays 31 32 33, and corresponding stays may be carried to an overhead frame or deck when desirable. Guard-rails 34 are used to prevent persons from falling into the machinery.

The following is what I claim as new and desire to secure by Letters Patent:

1. The shafting constructed, substantially as herein set forth, in sections 1 and interposed journal-sections 2 3, for the purpose set forth.

2. The combination, with the journal-sections 2, of the bearing-rolls 4 and their housings 5 and springs 6, substantially as and for the purposes set forth.

3. The combination, with the journals 3, of the anti-friction rolls 4, 9, and 10, surrounding the said journals, so as to support the same, and provided with springs to yield to sudden shocks or strains and restore the journals to their normal position.

4. The combination, with the journals 3, of the anti-friction bearing-rolls and their housings guided in vertical and horizontal direction, as described, to yield to strains and shocks and restore the journals to normal position.

5. The combination, with the shaft-sections 1 and journals 2, of collars 20 21 and connecting-bolts 22, as and for the purposes set forth.

6. The combination, with the shaft-sections 1, journals 3, and collars 20 21, of springs 24 25, as and for the purposes set forth.

7. The combination, with the shafting 1 2 3, constructed in sections, as herein described, of bearing-rolls 26, for supporting the centers of the main shaft-sections, as herein shown and described.

THOMAS SUTTON.

Witnesses:
OCTAVIUS KNIGHT,
HORACE J. FROST.